(12) United States Patent
Hunter

(10) Patent No.: US 7,511,838 B2
(45) Date of Patent: Mar. 31, 2009

(54) METHOD AND APPARATUS FOR REVIEWING CAPTURED IMAGES

(75) Inventor: Andrew Arthur Hunter, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1251 days.

(21) Appl. No.: 10/183,496

(22) Filed: Jun. 28, 2002

(65) Prior Publication Data

US 2003/0020950 A1 Jan. 30, 2003

(30) Foreign Application Priority Data

Jul. 27, 2001 (GB) .................. 0118443.1

(51) Int. Cl.
*G03B 37/02* (2006.01)
*G06K 15/00* (2006.01)
(52) U.S. Cl. ........................ 358/1.15; 396/20
(58) Field of Classification Search ............. 346/107.2; 396/29, 57, 58, 59, 429, 1.18, 4.33, 20; 358/1.18, 358/468, 1.15; 710/11, 33; 345/676, 157, 345/180
See application file for complete search history.

(56) References Cited

U.S. PATENT DOCUMENTS

| | | | |
|---|---|---|---|
| 6,000,864 A * | 12/1999 | Hanada | 400/62 |
| 6,032,120 A * | 2/2000 | Rock et al. | 705/2 |
| 6,046,712 A | 4/2000 | Beller et al. | |
| 6,349,001 B1 * | 2/2002 | Spitzer | 359/618 |
| 6,480,179 B1 * | 11/2002 | Akimoto | 345/92 |
| 6,535,243 B1 * | 3/2003 | Tullis | 348/207.1 |
| 6,690,887 B1 * | 2/2004 | Sano | 398/127 |
| 6,788,332 B1 * | 9/2004 | Cook | 348/14.02 |
| 7,002,964 B1 * | 2/2006 | Ohnishi et al. | 370/395.2 |
| 7,103,357 B2 * | 9/2006 | Kirani et al. | 455/426.1 |
| 2002/0075392 A1 * | 6/2002 | Imaeda | 348/333.05 |
| 2002/0147773 A1 * | 10/2002 | Herman | 709/203 |
| 2003/0101294 A1 * | 5/2003 | Saint-Hilaire et al. | 710/11 |
| 2004/0218045 A1 * | 11/2004 | Bodnar et al. | 348/207.1 |

OTHER PUBLICATIONS

IrDA: Background and Overview http://msdn.microsoft.com/library/en-us/nirda/html/irdawp.asp?frame=true.*

* cited by examiner

*Primary Examiner*—Jerome Grant, II

(57) ABSTRACT

A portable image capture apparatus comprises an image capture device for capturing still and/or moving images, and a transmitter for transmitting image data representative of captured images directly from said image capture apparatus via a wireless communication path to a remote device which is adapted to display said one or more captured images upon receipt of said image data, the apparatus further comprising an arrangement for enabling a user to remotely select the remote device of their choice. This arrangement is particularly advantageously employed where the image capture device is embedded in eye glasses.

17 Claims, 3 Drawing Sheets

METHOD AND APPARATUS FOR REVIEWING CAPTURED IMAGES

FIELD OF THE INVENTION

This invention relates to a method and apparatus for reviewing images captured by an image capture device and, in particular but not exclusively, to a method and apparatus for reviewing images captured by a miniature image capture device built into, for example, a head-mountable arrangement.

BACKGROUND OF THE INVENTION

Many conventional personal, hand-held image capture devices include an integrated display screen to allow the user to review captured still and/or moving images. With the development of technology in this field, it is becoming increasingly possible to miniaturise image capture devices to the extent that they can be embedded in, for example, head mountable arrangements. For example, it is now possible to embed a miniature image capture device in a pair of sunglasses or the like.

Such head mounted image capture devices do not generally include any display means for allowing the user to review captured images, and although the inclusion of such display means is technically viable, the resultant arrangement would generally become relatively cumbersome, and expensive. Although the inclusion of the display means within the head mountable arrangement would in certain circumstances be justified, for general use, the requirement for occasional review of captured images does not normally justify the integration of such display means.

Another problem with wearable image capture devices is the issue of storage of captured images. The integration of large amounts of storage means into such an arrangement increases the overall size, weight and cost, which is obviously undesirable.

Thus, the present invention addresses the problem of allowing the review of images captured using a head mounted or similar type of miniature image capture device. Of course, all of the captured images can be viewed and reviewed once the user has access to their personal computer or a video player, for example. This is usually achieved by transferring a removable storage medium to the chosen display device, or by having a hard wired or wireless link and specifically initiating data transfer across the link. Further interaction is then usually required to cause the transferred data to be displayed by the second device. However, this still fails to provide the user with a way of reviewing images while they are out and about and, once they are within easy reach of their personal computer or video player, it is usually too late to go back and recapture an image which is of insufficient quality or captured from the wrong angle, for example. In any event, even if the user has access to a personal computer or video player other than their own while they are out, the requirement for initiation of data transfer across the data transfer link and the usual further interaction required to display captured images makes it an inconvenient and time consuming method for conducting a brief intermediate review of the captured images.

We have now devised an arrangement which seeks to overcome the problems outlined above and provide a user with a means of quickly and conveniently storing and/or reviewing images captured by a miniature, preferably wearable, image capture device on a storage and/or display means which is not head-mounted or integral to the portable image capture device.

SUMMARY OF THE INVENTION

In accordance with the present invention there is provided portable image capture apparatus comprising an image capture device for capturing still and/or moving images, and a transmitter for transmitting image data representative of captured images directly from said image capture apparatus via a wireless communication path to a remote display and/or storage and/or printing device which is adapted to display and/or store and/or print said one or more captured images upon receipt of said image date, the apparatus further comprising an arrangement for enabling a user to remotely select the display and/or storage and/or printing device of their choice.

A method of displaying and/or storing and/or printing captured images comprising capturing one or more images using portable image capture apparatus, transmitting image data representative of said one or more captured images directly from said image capture apparatus to a remote display and/or storage and/or printing device, and storing and/or displaying and/or printing said one or more images in or on said remote display and/or storage and/or printing device upon receipt of said image data, the method further comprising the step of remotely selecting said remote display and/or storage and/or printing device.

Thus, in accordance with the present invention, the portable image capture device, which may be adapted to capture still and/or moving images, is embedded or mounted in a unit which may not include a display device for viewing images captured thereby, and may, as a minimum include storage capacity, sufficient only for one still image or one video clip. After one or more still images or video clips have been captured by the image capture device, the image data representative of the images can be transmitted to a remote display and/or storage device which automatically stores and/or displays the images in response to receipt thereof. Thus images captured by the portable image capture device can easily and conveniently be received (and deleted if required). Further the present invention provides for convenient transfer of captured images to another storage device, which enables (relatively small) amounts of storage on the head-mounted camera to be freed for re-use, if required.

The remote display and/or storage device may comprise, for example, a portable personal computer (having a screen and storage means), a handheld computer or a watch or mobile telephone having a bitmapped liquid crystal display (LCD). The remote display means may even comprise a television screen, although it will be understood that images displayed in accordance with the present invention on a television screen will still involve a direct transmission of image data from the image capture device to the television screen in question, as opposed to the conventional broadcast of television signals from a central broadcasting means.

According to the present invention, the user has the option of selectively transmitting the image stream to a display and/or storage device of their choice, preferably by pointing the image capture device at the chosen device (which is achieved by the user turning their head towards the chosen device in the case of a head-mounted image capture device), the image capture device beneficially including signalling means for transmitting a continuous or periodic request for image transfer and display and/or storage, in response to receipt of which the display and/or storage device is preferably adapted to transmit a signal back to the image capture device to initiate data transfer therefrom. In one embodiment, the display device is arranged to automatically display and/or store the images as they are received from the image capture device.

The image capture device and remote display devices beneficially comprise fast infra red transceivers or the like for transmitting and receiving said request for image transfer and data transfer initiation signals, by means of narrow beam infra red signals. However, many different types of wireless transmission techniques may be employed in the present invention, including short range radio and the like.

As stated above, the image transfer request signal transmitted by the image capture device may be continuous such that image data can be transferred to the first remote device that receives and responds to the request. However, in a more preferred embodiment, transmission of the request signal is initiated by the user by, for example, clicking their fingers, pressing a button on the image capture device, etc.

BRIEF DESCRIPTION OF THE DRAWINGS

An embodiment of the present invention will now be described by way of example only and with reference to the accompanying drawing, in which.

DETAILED DESCRIPTION OF THE INVENTION

Figure 1:
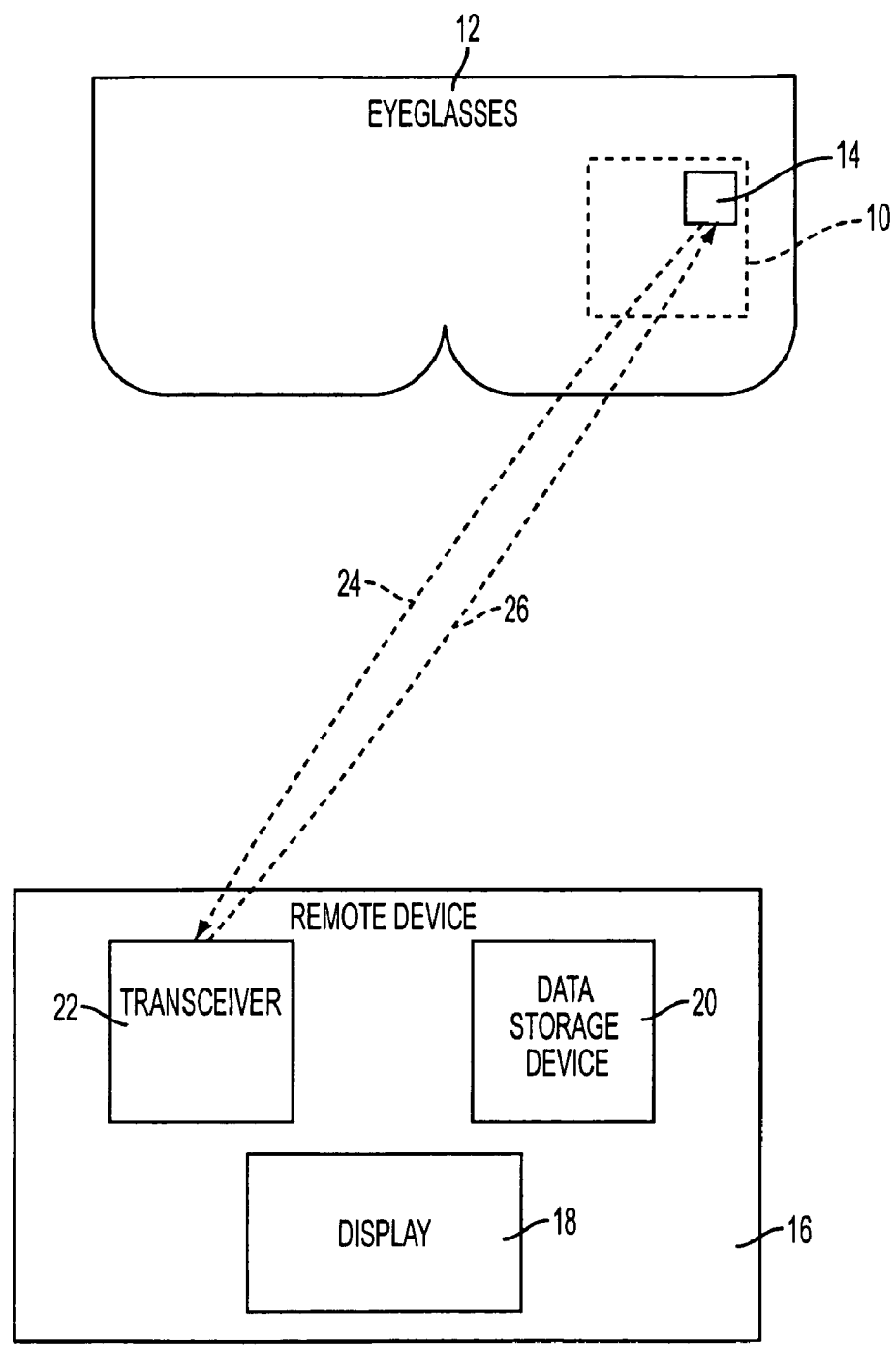
FIG. 1 is a schematic block diagram of apparatus according to an exemplary embodiment of the present invention.

Referring to FIG. 1, apparatus according to an exemplary embodiment of the present invention comprises an image capture device 10 embedded in a head mountable arrangement, such as a pair of eyeglasses 12. Included in the image capture device 10 is a fast infrared transceiver 14. The apparatus also includes a remote storage and display device 16 having a display screen 18, a data storage area 20 and a second fast infrared transceiver 22.

In use, a user wears the eyeglasses 12 in a conventional manner and captures images within their field of view as required using the image capture device 10. If it is required to store and/or display the captured images, the user directs their gaze at the remote device 16, and presses a button (not shown) on the eyeglasses 12, in or on a separate unit, or on the remote device 16 to transmit a REQ signal to initiate a display, storage or printing action, in response to which the second transceiver 22 in the remote device 16, sends a transfer request or "ACK" signal 26 to the transceiver 14 in the image capture device 10 to initiate data transfer therefrom, in response to which the transceiver 14 in the image capture device transmits a stream 24 of image data representative of the captured image(s) to the second transceiver 22 for automatic display and/or storage and/or printing by the remote device 16. It will be appreciated that the resolution of the image transmitted to the remote device 16 for printing or display may be lower than the resolution that would be sent for storage.

Figure 2:
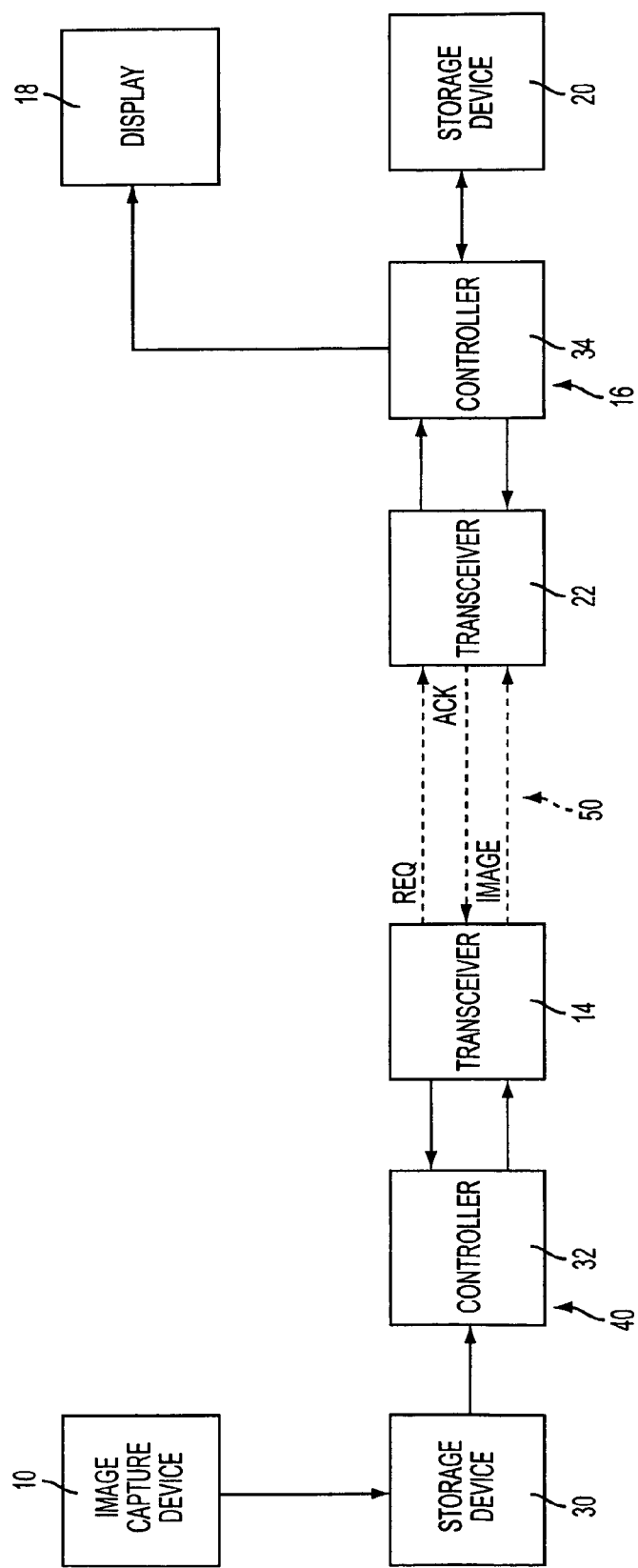
FIG. 2 is a more detailed schematic block diagram of the apparatus of FIG. 1.

In more detail, and referring to FIG. 2 of the drawings, apparatus according to an exemplary embodiment of the invention comprises an image capture device 10 embedded in a head mountable arrangement, such as a pair of eyeglasses (as described above), a storage device 30 and a controller 32. The apparatus further comprises a short range fast infrared transceiver 14. A remote storage and display device 16 suitable for use with apparatus according to this exemplary embodiment of the invention comprises a second short range fast infrared receiver 22, a controller 34, a data storage device 20 and a display screen 18.

Electromagnetic radiation generally travels in a straight line. Thus, in the case of a short range transmitter and receiver, respectively transmitting and receiving, say, infrared radiation signals, they must be substantially in line with each other for a signal transmitted by the transmitter to be received by the receiver.

Thus, in this case, where the first short range fast infrared transceiver 14 is mounted on or embedded in the head mountable arrangement along with the image capture device 10, the user must essentially turn and direct their gaze (or at least the head mountable arrangement) at the remote storage and display device 16 for signals and data to be transmitted and received between the respective transceivers 14, 22.

In use, the first transceiver 14 sends a request (REQ) signal which is received by the transceiver 22 in the remote storage and display device 16 at which the user is directing their gaze. The transmission of the REQ signal by the transceiver 14 may be initiated by some user action (e.g. by pressing a button or activating a switch which may be included in or on the head mountable arrangement or provided in or on a separate unit, which may be hand-held or worn elsewhere about the user's person, for example, on their belt). Alternatively, the transceiver 14 may be arranged to transmit a continuous or intermittent REQ signal for receipt by any remote storage and display device 16 towards which the user is directing their gaze.

Figure 3:
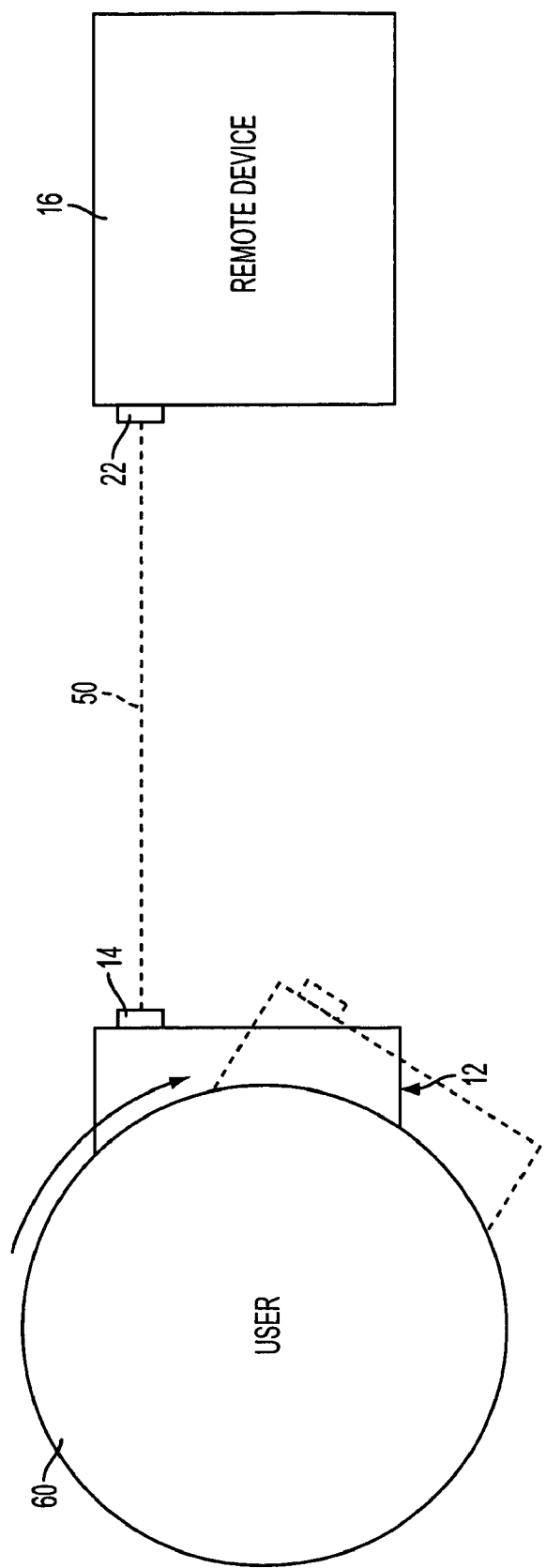
FIG. 3 is a schematic diagram (plan view) illustrating the operation of one specific exemplary embodiment of the present invention.

In any event, upon receipt by the transceiver 22 of a REQ signal from transceiver 14, it transmits an acknowledge (ACK) signal for receipt by the transceiver 14 (assuming that the head mountable arrangement is still directed toward the remote device 16). Upon receipt by the transceiver 14 of an ACK signal from the selected remote storage and display device 16, a short range wireless communication link 50 is effectively established between the head mountable arrangement and the remote device 16, and the controller 32 retrieves image data from the storage device 30, converts said image data to a suitable format (if necessary) and causes the image data to be transmitted (via the receiver 14) to the remote device 16 for receipt by the transceiver 22. It will be appreciated that transmission data between the transceivers 14, 22 may be prevented or terminated simply by the user turning their head 60 away from the remote device 16, such that the transceivers 14, 22 are no longer in line with each other, as shown in FIG. 3 of the drawings.

Upon receipt by the transceiver 16 of the image data from the head mountable arrangement, such data may be stored, displayed or printed by the remote device 16 according to the nature of the device 16 and/or the user's requirements.

It will be understood that the remote device may be adapted simply to automatically display the images received from the image capture device for review thereof by the user, or it may be adapted to automatically store the transmitted image data and/or display it as required.

In the foregoing specification, the invention has been described with reference to specific exemplary embodiments thereof It will, however, be apparent to a person skilled in the art that various modifications and changes may be made thereto without departing from the broader spirit and scope of the invention as set forth in the appended claims. Accordingly, the specification and drawings are to be regarded in an illustrative, rather than a restrictive, sense.

The invention claimed is:

1. Portable image capture apparatus comprising an image capture device for capturing still and/or moving images, a storage device for storing image data representative of captured images, a controller for retrieving the image data from the storage device and formatting the image data and a transmitter for transmitting the image data directly from said image capture apparatus via a wireless communication path to a remote device which is adapted to automatically display said one or more captured images upon receipt of said image data, the apparatus further comprising an arrangement for enabling a user to remotely select the remote device of their choice.

2. Apparatus according to claim 1, wherein said remote device is adapted to automatically store or print said one or more captured images in response to receipt of said image data.

3. Apparatus according to claim 1, wherein said remote device comprises a portable personal computer having a screen, one or more storage areas and/or printing apparatus, a hand-held computer or a watch or mobile telephone having a bit mapped liquid crystal display.

4. Apparatus according to claim 1, wherein the remote device comprises a television screen.

5. Apparatus according to claim 1, wherein the image capture device includes signaling apparatus for transmitting a continuous or periodic request in response to a signal or automatically for image transfer, in response to receipt of which the remote device may be adapted to transmit a signal back to the image capture device to initiate the data transfer therefrom.

6. Apparatus according to claim 1, wherein said image capture device is mounted in or on a pair of eyeglasses.

7. Apparatus according to claim 1, wherein said remote device comprises a transmitter, actuable by a user, for transmitting a data transfer request signal to said image capture device, in response to receipt of which said image capture device transmits said image data to said remote.

8. Apparatus according to claim 1, wherein the image capture device and remote device comprise fast infra-red transceivers for transmitting and receiving signals therebetween.

9. Apparatus according to claim 1, wherein said image capture device comprises an arrangement, actuable by a user, for initiating transmission of said image data to said remote device.

10. Apparatus according to claim 1, wherein said image capture device is head mounted or mountable.

11. Apparatus according to claim 1, comprising an arrangement for enabling a user to select the remote device of their choice by pointing the apparatus at the chosen remote device.

12. A method of displaying captured images, the method comprising the steps of capturing one or more images using a portable image capture device, storing image data representative of said one or more captured images, retrieving the image data, formatting said image data, transmitting the image data directly from said image capture device to a remote device, and automatically displaying said one or more images in or on said remote device upon receipt of said image data, the method further comprising the step of remotely selecting said remote device.

13. Image capture apparatus comprising a camera for capturing still and/or moving images, a storage device for storing image data representative of captured images, a controller for retrieving the image data from the storage device and formatting the image data and a transmitter for transmitting the image data directly from the camera via a wireless communication path to a remote device having a receiver for receiving said image data and adapted to automatically display said one or more captured images upon receipt of said image data, the apparatus being arranged to enable a user to select a remote device of their choice by pointing said apparatus at said remote device in substantially the same orientation as for image capture.

14. Image capture apparatus according to claim 13, being arranged to enable a user to select a remote device of their choice by positioning said apparatus relative to said remote device such that a transmission path of said transmitter is substantially in line with said receiver.

15. Head-mounted or head mountable image capture apparatus comprising a camera, a storage device for storing image data representative of captured images, a controller for retrieving the image data from the storage device and formatting the image data and a transmitter for transmitting the image data captured by said camera from said camera to a remote display, storage and printing device, said remote device being selectable by a user, by directing their head, on which said apparatus is mounted, toward a chosen remote device.

16. Apparatus according to claim 15, mounted in or on a pair of eyeglasses or sunglasses.

17. A method of displaying, storing or printing captured images, the method comprising the steps of capturing one or more images using head-mounted portable image capture apparatus, storing image data representative of said one or more captured images, retrieving the image data, formatting the image data, and transmitting the image data directly from said image capture apparatus to a chosen remote device, and automatically storing, displaying or printing said one or more images in or on said remote device upon receipt of said image data, the method further comprising the step of a user selecting said remote device by turning their face toward said remote device such that said image capture apparatus and said remote device are substantially in line with each other.

* * * * *